United States Patent
Wang

(10) Patent No.: US 10,731,014 B2
(45) Date of Patent: Aug. 4, 2020

(54) MATRIX RESINS TOUGHENED WITH HYBRID POLYAMIDE PARTICLES

(71) Applicant: Hexcel Corporation, Dublin, CA (US)

(72) Inventor: Yen-Seine Wang, San Ramon, CA (US)

(73) Assignee: HEXCEL CORPORATION, Dublin, CA (US)

( * ) Notice: Subject to any disclaimer, the term of this patent is extended or adjusted under 35 U.S.C. 154(b) by 0 days.

(21) Appl. No.: 16/502,277

(22) Filed: Jul. 3, 2019

(65) Prior Publication Data

US 2019/0322825 A1    Oct. 24, 2019

Related U.S. Application Data

(60) Continuation-in-part of application No. 16/135,177, filed on Sep. 19, 2018, now Pat. No. 10,465,052, which is a division of application No. 15/622,585, filed on Jun. 14, 2017, now Pat. No. 10,106,661, which is a continuation-in-part of application No. 15/439,981, filed on Feb. 23, 2017, now Pat. No. 10,000,615, which is a continuation-in-part of application No. 15/189,994, filed on Jun. 22, 2016, now Pat. No. 10,208,176, application No. 16/502,277, which is a continuation-in-part of application No. 16/158,151, filed on Oct. 11, 2018, now Pat. No. 10,577,472, which is a continuation-in-part of application No. 15/886,008, filed on Feb. 1, 2018, now Pat. No. 10,472,479.

(51) Int. Cl.
| | |
|---|---|
| *C08J 5/24* | (2006.01) |
| *C08J 5/04* | (2006.01) |
| *B32B 27/38* | (2006.01) |

(52) U.S. Cl.
CPC .............. *C08J 5/24* (2013.01); *C08J 5/042* (2013.01); *B32B 27/38* (2013.01); *B32B 2262/106* (2013.01); *B32B 2264/0264* (2013.01); *C08J 2363/00* (2013.01); *C08J 2363/02* (2013.01); *C08J 2363/04* (2013.01); *C08J 2463/04* (2013.01); *C08J 2477/00* (2013.01); *C08J 2477/02* (2013.01); *C08J 2479/08* (2013.01); *C08J 2481/06* (2013.01)

(58) Field of Classification Search
None
See application file for complete search history.

(56) References Cited

U.S. PATENT DOCUMENTS

| | | | | |
|---|---|---|---|---|
| 7,754,322 B2* | 7/2010 | Tilbrook | ................ | C08G 59/38 428/297.4 |
| 2014/0058013 A1* | 2/2014 | Wang | ........................ | C08J 5/24 523/427 |
| 2015/0344686 A1* | 12/2015 | Shimizu | ..................... | C08J 5/24 523/468 |
| 2018/0258240 A1 | 9/2018 | Mutsuda et al. | | |

FOREIGN PATENT DOCUMENTS

WO    2017-035175 A1    3/2017

* cited by examiner

*Primary Examiner* — Ana L. Woodward
(74) *Attorney, Agent, or Firm* — W. Mark Bielawski; David J. Oldenkamp

(57) ABSTRACT

Pre-impregnated composite material (prepreg) that can be cured/molded to form aerospace composite parts. The prepreg includes carbon reinforcing fibers and an uncured resin matrix. The resin matrix includes an epoxy component, polyethersulfone as a toughening agent, and a curing agent. The resin matrix is also composed of a thermoplastic particle component that includes hybrid polyamide particles wherein each hybrid particle contains a mixture of amorphous and semi-crystalline polyamide.

14 Claims, 1 Drawing Sheet

MATRIX RESINS TOUGHENED WITH HYBRID POLYAMIDE PARTICLES

This application is a continuation-in-part of U.S. Ser. No. 16/135,177, filed on Sep. 19, 2018, now U.S. Pat. No. 10,465,042, which issued on Nov. 5, 2019, which is divisional of U.S. Ser. No. 15/622,585, filed on Jun. 14, 2017, now U.S. Pat. No. 10,106,661, which issued on Oct. 23, 2018. U.S. Ser. No. 15/622,585 is a continuation-in-part of U.S. Ser. No. 15/439,981, filed on Feb. 23, 2017, now U.S. Pat. No. 10,000,615, which issued on Jun. 19, 2018. U.S. Ser. No. 15/622,585 is also a continuation-in-part of U.S. Ser. No. 15/189,994, filed on Jun. 22, 2016, now U.S. Pat. No. 10,208,176, which issued on Feb. 19, 2019. This application is also a continuation-in-part of U.S. Ser. No. 16/158,151, filed on Oct. 11, 2018, now U.S. Pat. No. 10,577,472, which issued on Mar. 3, 2020, which is a continuation-in-part of U.S. Ser. No. 15/886,008, filed on Feb. 1, 2018.

BACKGROUND OF THE INVENTION

1. Field of the Invention

The present invention relates generally to pre-impregnated composite material (prepreg) that is used in making high performance composite parts that are especially well-suited for use as aerospace components. The present invention is directed to epoxy resins that are toughened with thermoplastic materials and used as the resin matrix in such prepreg. More particularly, the present invention is directed to prepreg that includes polyamide particles as one of the thermoplastic materials used to toughen the resin matrix.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part is of critical importance.

Pre-impregnated composite material (prepreg) is used widely in the manufacture of composite parts. Prepreg is a combination that typically includes uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network affect the structural properties of the part.

Prepreg is a preferred material for use in manufacturing load-bearing or primary structural parts and particularly aerospace primary structural parts, such as wings, fuselages, bulkheads and control surfaces. It is important that these parts have sufficient strength, damage tolerance and other requirements that are routinely established for such parts and structures.

The fiber reinforcements that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber reinforcement configurations are combined with a carefully controlled amount of uncured resin. The resulting prepreg is typically placed between protective layers and rolled up for storage or transport to the manufacturing facility. Combinations of carbon fibers and an epoxy resin matrix have become a popular combination for aerospace prepreg.

Prepreg may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers. This material is commonly used as a sheet molding compound to form parts and molds for use in making parts.

The compressive and tensile strengths of a cured composite part are largely dictated by the individual properties of the reinforcing fiber and matrix resin, as well as the interaction between these two components. In addition, the fiber-resin volume ratio is an important factor. In many aerospace applications, it is desirable that the composite part exhibit high compression and tensile strengths. The open hole compression (OHC) test is a standard measure of the compression strength of a composite material. The open hole tension (OHT) test is also a standard measure of the tensile strength of a composite material.

In many aerospace applications, it is desirable that the composite part exhibit high compression and/or tensile strength under both room temperature/dry conditions and hot/wet conditions. However, attempts to keep compression and tensile strengths high often results in negative effects on other desirable properties, such as damage tolerance and interlaminar fracture toughness.

Selecting higher modulus resins can be an effective way to increase the compression strength of a composite. However, this can result in a tendency to reduce damage tolerance, which is typically measured by a decrease in compressive properties, such as compression after impact (CAI) strength. Accordingly, it is can be difficult to achieve a simultaneous increase in both the compression and/or tensile strengths without deleteriously affecting the damage tolerance.

Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces.

One approach to increasing interlaminar fracture toughness for parts made from carbon fiber/epoxy resin prepreg has been to introduce thermoplastic sheets as interleaves between layers of prepreg. However, this approach tends to yield stiff, tack-free materials that are difficult to use. Another approach has been to add thermoplastic particles to the epoxy resin so that a resin interlayer containing the thermoplastic particles is formed between the fiber layers of the final part. Polyamides have been used as such thermoplastic particles. It also has been known to include a thermoplastic toughening agent in the epoxy resin. The toughening agent, such as polyether sulfone (PES) or polyetherimide (PEI), is dissolved in the epoxy resin before it is applied to the carbon fibers. Thermoplastic toughened epoxy resins, which include a combination of both thermoplastic toughening particles and a thermoplastic toughening agent, have been used in combination with carbon fiber to make aerospace prepreg.

The epoxy resin matrix may include one or more types of epoxy resin. It is known that various combinations of different types of epoxy resins may result in a wide variation in the properties of the final composite part. The curing agent used to cure the epoxy resin matrix can also substantially affect the properties of the final composite part. When formulating an epoxy resin for use as the resin matrix in aerospace prepreg, it is difficult to predict if a new combination of epoxy resin types and curatives will provide the desired combination of properties required for aerospace parts. This is especially the case when a thermoplastic toughening agent and thermoplastic particles form part of the epoxy resin formulation. Accordingly, there is a great deal of testing involved when one attempts to formulate new thermoplastic toughened epoxy resins in order to determine if the resin is suitable for use as resin matrix in aerospace prepreg.

Although existing aerospace prepregs are well suited for their intended use in providing composite parts that are strong and damage tolerant, there still is a continuing need to provide aerospace prepreg that may be used to make composite parts that exhibit desirable combinations of high tensile and compressive strengths (OHC and OHT) while maintaining high levels of damage tolerance (CAI) and interlaminar fracture toughness (G1c and G2c).

SUMMARY OF THE INVENTION

In accordance with the present invention, pre-impregnated composite material (prepreg) is provided that can be molded to form composite parts that have high levels of strength and also have high levels of damage tolerance and interlaminar fracture toughness.

The pre-impregnated composite materials of the present invention are composed of reinforcing fibers and an uncured resin matrix. The uncured resin matrix includes a resin component made up of one or more epoxy resins, a thermoplastic toughening agent and a curing agent. The uncured resin matrix further includes a thermoplastic particle component which includes polyamide particles. In preferred embodiments, the polyamide particles are hybrid polyamide particles that are each composed of a mixture of semi-crystalline and crystalline polyamide.

The present invention also covers methods for making the prepreg and methods for molding the prepreg into a wide variety of composite parts. The invention also covers the composite parts that are made using the improved prepreg.

It has been found that resins having the matrix resin formulation, as set forth above, can be used to form prepreg that can be molded to form composite parts that have unexpectedly high levels of interlaminar fracture toughness.

The above described and many other features and attendant advantages of the present invention will become better understood by reference to the following detailed description when taken in conjunction with the accompanying drawings.

DETAILED DESCRIPTION OF THE INVENTION

Uncured epoxy resin compositions in accordance with the present invention may be used in a wide variety of situations where a thermoplastic-toughened epoxy resin matrix is desired. Although the uncured epoxy resin composition may be used alone, the compositions are generally used as a matrix resin that is combined with a fibrous support to form composite material composed of the fibrous support and the resin matrix. The composite materials may be in the form of a prepreg, partially cured prepreg or a completely cured final part. The term "uncured", when used herein in connection with: prepreg; the resin before impregnation into the fibrous support; the resin matrix that is formed when the fibrous support is impregnated with the resin; or composite material, is intended to cover items that may have been subjected to some curing, but which have not been completely cured to form the final composite part or structure.

Although the uncured composite materials may be used for any intended purpose, they are preferably used in making parts for aerospace vehicles, such as commercial and military aircraft. For example, the uncured composite materials may be used to make non-primary (secondary) aircraft structures. However the preferred use of the uncured composite material is for structural applications, such as primary aircraft structures. Primary aircraft structures or parts are those elements of either fixed-wing or rotary wing aircraft that undergo significant stress during flight and which are essential for the aircraft to maintain controlled flight. The uncured composite materials may also be used for other structural applications to make load-bearing parts and structures in general.

Figure 1:
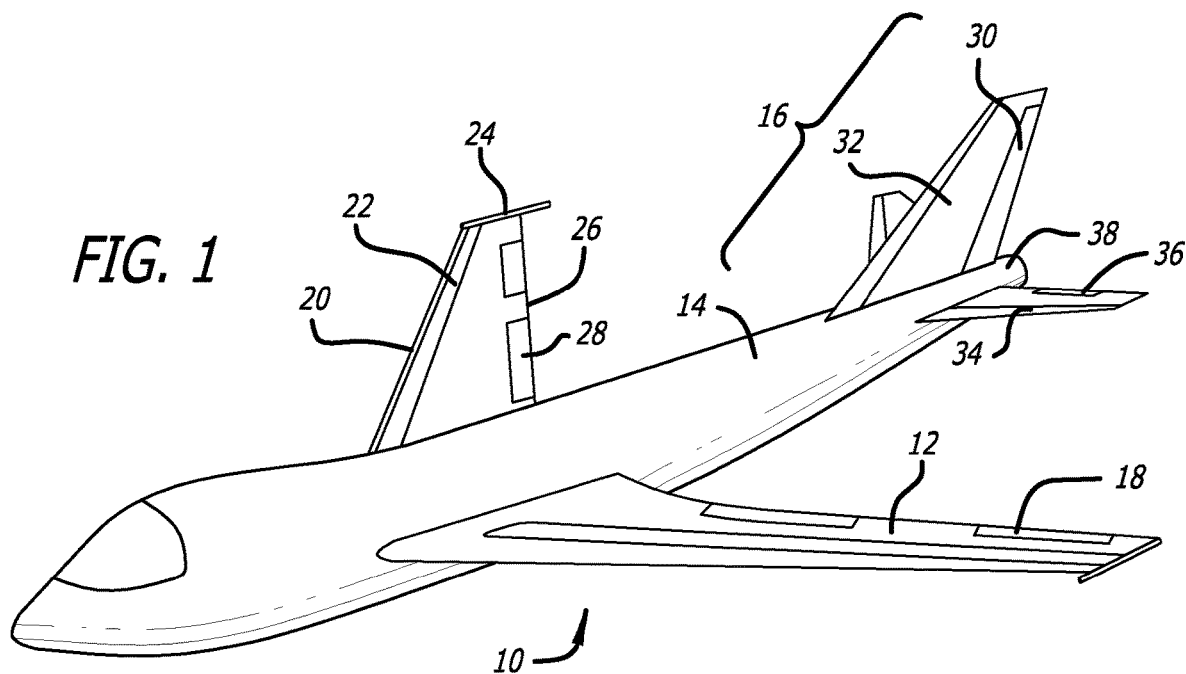
FIG. 1 is a perspective view of an aircraft, which depicts exemplary primary aircraft structures that can be made using composite materials in accordance with the present invention.
Figure 2:
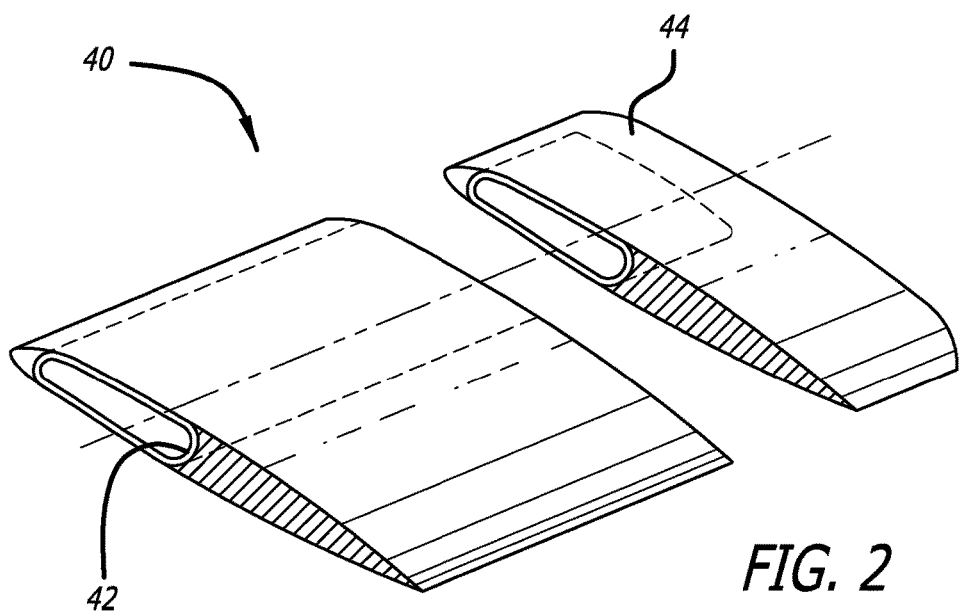
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using uncured composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use as the matrix resin in conventional prepreg manufacturing and curing processes.

The pre-impregnated composite materials of the present invention are composed of reinforcing fibers and an uncured resin matrix. The reinforcing fibers can be any of the conventional fiber configurations that are used in the prepreg and composite sheet molding industry. Carbon fibers are preferred as the reinforcing fibers.

A preferred resin used to form the resin matrix (matrix resin) includes a resin component that is made up of a hydrocarbon epoxy novolac resin in combination with a trifunctional epoxy resin and optionally a tetrafunctional epoxy resin. The matrix resin further includes a hybrid thermoplastic particle component, a thermoplastic toughening agent and a curing agent.

The hydrocarbon epoxy novolac resin preferably has a dicyclopentadiene backbone and is available commercially from Huntsman Corporation (The Woodlands, Tex.) as TACTIX 556. This type of hydrocarbon novolac resin is referred to herein as a dicyclopentadiene novolac epoxy resin. The chemical formula for TACTIX 556 is

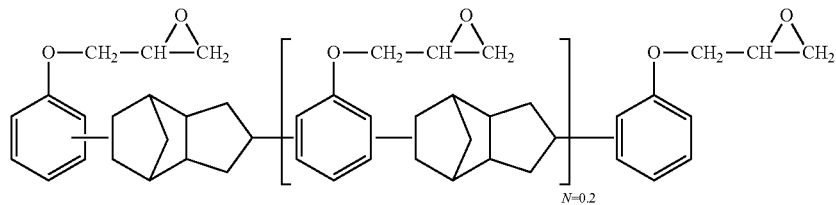

TACTIX 556 is an amber to dark colored semi-solid hydrocarbon epoxy novolac resin that has an epoxy index (ISO 3001) of 4.25 to 4.65 eq/kg and epoxy equivalent (ISO 3001) of 215-235 g/eq. The viscosity of TACTIX 556 at 79° C. (ISO 9371B) is 2250 mPa s. Dicyclopentadiene epoxy novolac resins other than TACTIX 556 may be used in place of TACTIX 556 provided they have the same chemical formula and properties. For example, another suitable dicyclopentadiene epoxy novolac resin is XD-1000-2L which is available commercially from Nippon Kayaku Co., Ltd (Chiyoda-ku, Tokyo). TACTIX 556 is the preferred hydrocarbon epoxy novolac resin for use in accordance with the present invention.

When a tetrafunctional epoxy resin is included in the preferred resin component, the amount of hydrocarbon epoxy novolac resin present in the uncured resin may vary from 8 to 20 weight percent based on the total weight of the uncured resin matrix. Preferably, the uncured resin will contain from 10 to 17 weight percent dicyclopentadiene hydrocarbon epoxy novolac resin. Uncured resin formulations that contains from 13 to 15 weight percent dicyclopentadiene hydrocarbon epoxy novolac resin are particularly preferred. In this embodiment of the invention, which is referred to herein as the DEN/TRIF/TETF matrix resin, the uncured resin component is composed of dicyclopentadiene epoxy novolac resin, a trifunctional epoxy resin and a tetrafunctional epoxy resin.

In the DEN/TRIF/TETF matrix resin, a preferred exemplary trifunctional epoxy resin is triglycidyl para-aminophenol. Triglycidyl para-aminophenol is available commercially from Huntsman Advanced Materials (The Woodlands, Tex.) under the trade name Araldite MY0510. Another suitable trifunctional epoxy resin is triglycidyl meta-aminophenol. Triglycidyl meta-aminophenol is available commercially from Huntsman Advanced Materials (The Woodlands, Tex.) under the trade name Araldite MY0600 and from Sumitomo Chemical Co. (Osaka, Japan) under the trade name ELM-120. Other trifunctional epoxy resins may be used provided that they have properties that are the same or similar to the properties of triglycidyl para-aminophenol or triglycidyl meta-aminophenol.

In the DEN/TRIF/TETF matrix resin embodiment, an exemplary tetrafunctional epoxy resin is N,N,N',N'-tetraglycidyl-4,4'-diaminodiphenyl methane (TGDDM) which is available commercially as Araldite MY720 and MY721 from Huntsman Advanced Materials (The Woodlands, Tex.), or ELM 434 from Sumitomo Chemical Industries, Ltd. (Chuo, Tokyo). Other tetrafunctional epoxy resins may be used provided that they have properties that are the same or similar to the properties of N,N,N',N'-tetraglycidyl-4,4'-diaminodiphenyl methane.

In the DEN/TRIF/TETF matrix resin, the total amount of trifunctional and tetrafunctional epoxy resin may vary from 35 to 45 weight percent based on the total weight of the uncured resin. It is preferred that that the weight ratio between the trifunctional and tetrafunctional resins be from 1.0:1.5 to 1.5:1.0. It is particularly preferred that the weight ratio between the trifunctional and tetrafunctional resins be from 1.1:1.0 to 1.3:1.0.

In another preferred embodiment of the invention, the resin component contains only dicyclopentadiene novolac epoxy resin and triglycidyl aminophenol epoxy resin. In the resin component of this embodiment, which is referred to herein as the DEN/TRIF matrix resin, the dicyclopentadiene novolac epoxy resin is present in the range 4 wt % to 30 wt %, based on the total weight of the uncured resin matrix. Preferably, the dicyclopentadiene novolac epoxy resin is present in the range 17 wt % to 27 wt %, based on the total weight of the uncured resin matrix. More preferably, the dicyclopentadiene novolac epoxy resin is present in the range 20 wt % to 24 wt %, based on the total weight of the uncured resin matrix.

In the DEN/TRIF matrix resin, the triglycidyl aminophenol epoxy resin is present in the range 20 wt % to 55 wt %, based on the total weight of the uncured resin matrix. Preferably, the triglycidyl aminophenol epoxy resin is present in the range 26 wt % to 36 wt %, based on the total weight of the uncured resin matrix. More preferably, the triglycidyl aminophenol epoxy resin is present in the range 29 wt % to 33 wt %, based on the total weight of the uncured resin matrix. Triglycidyl meta-aminophenol is the preferred type of triglycidyl aminophenol epoxy resin for the DEN/TRIF matrix resin.

In the DEN/TRIF matrix resin, the weight ratio of triglycidyl aminophenol epoxy resin to dicyclopentadiene novolac epoxy resin may vary from 1:1 to 10.5:1. The preferred weight ratio range of triglycidyl aminophenol epoxy resin to dicyclopentadiene novolac epoxy resin is from 1.2:1 to 2.5:1. Most preferred is a weight ratio of triglycidyl aminophenol epoxy resin to dicyclopentadiene novolac epoxy resin that is about 2.0:1.

The uncured resin matrix in accordance with the present invention also includes a thermoplastic particle component that contains one or more types of thermoplastic particles. Exemplary thermoplastic particles are polyamide particles which are formed from the polymeric condensation product of bis(4-aminocyclohexyl)methane, including methyl derivatives and an aliphatic dicarboxylic acid selected from the group consisting of decane dicarboxylic acid and dodecane dicarboxylic acid. Bis(4-aminocyclohexyl)methane, and methyl derivatives thereof, are referred to herein as the "amine component". Bis(4-aminocyclohexyl)methane is also known as 4,4'-diaminocyclohexylmethane. This type of polyamide particle and the methods for making them are described in detail in U.S. Pat. Nos. 3,936,426 and 5,696,202, the contents of which are hereby incorporated by reference.

The formula for the amine component of the polymeric condensation product is

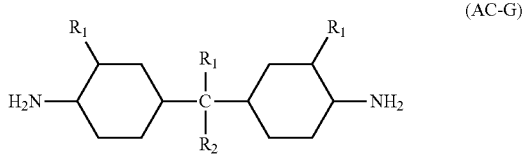

(AC-G)

where $R_2$ is hydrogen and $R_1$ is either methyl or hydrogen.

When $R_1$ is methyl and $R_2$ is hydrogen in formula AC-G, the formula for the resulting monomeric unit of the polymeric condensation product may be represented as follows:

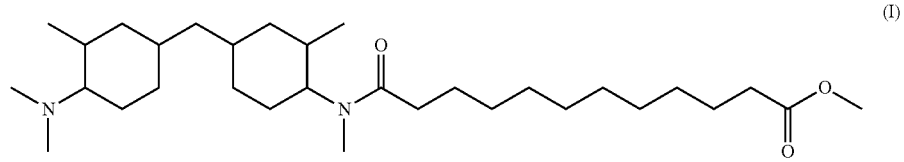

(I)

The molecular number of the polymeric condensation product will range from 14,000 to 20,000 with a molecular numbers of about 17,000 being preferred.

The polyamide particles should have particle sizes of below 100 microns. It is preferred that the particles range in size from 5 to 60 microns and more preferably from 10 to 30 microns. It is preferred that the average particle size is from 15 to 25 microns. The polyamide particles may be regular or irregular in shape. For example, the particles may be substantially spherical or they can be particles with a jagged shape.

One exemplary polyamide particle is made from polyamide where the amine component of the polymeric condensation product has the above formula (AC-G) in which $R_1$ both are methyl and $R_2$ both are hydrogen. Such polyamide particles may be made from the polymeric condensation product of 3,3'-dimethyl-bis(4-aminocyclohexyl)-methane and 1,10-decane dicarboxylic acid. The polyamide particles are made by combining, in a heated receiving vessel, 13,800 grams of 1,10-decane dicarboxylic acid and 12,870 grams of 3,3'-dimethyl-bis(4-aminocyclohexyl)methane with 30 grams of 50% aqueous phosphoric acid, 150 grams benzoic acid and 101 grams of water. The mixture is stirred in a pressure autoclave until homogeneous. After a compression, decompression and degassing phase, the polyamide condensation product is pressed out as a strand, passed under cold water and granulated to form the polyamide particles. Polyamide particles where $R_1$ both are methyl and $R_2$ both are hydrogen can also be made from GRILAMID TR90, which is commercially available from EMS-Chime (Sumter, S.C.). GRILAMID TR90 is the polymeric condensation product of 3,3'-dimethyl-bis(4-aminocyclohexyl)-methane and 1,10-decane dicarboxylic acid.

Another exemplary polyamide particle is made from polyamide where the amine component of the polymeric condensation product has the above formula (AC-G) in which $R_1$ and $R_2$ are both hydrogen. Such polyamide particles may be made in the same manner as described above, except that polyamide is the polymeric condensation product of bis(4-aminocyclohexyl)-methane and 1,10-decane dicarboxylic acid. The formula for the amine component of this preferred polymeric condensation product is

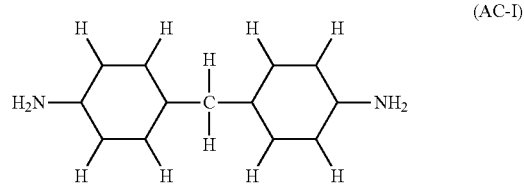 [SMILES: NC1CCC(CC2CCC(N)CC2)CC1]

(AC-I)

Formula AC-I corresponds to the preceding general formula (AC-G) where $R_1$ and $R_2$ are hydrogen. In addition, the hydrogen groups that are present at the 2, 5 and 6 positions on the cyclohexane groups, which are implied in the general formula (AC-G), are specifically shown in formula AC-I.

When the amine component is bis(4-aminocyclohexyl) methane (formula AC-I), the formula for the monomeric unit of the polymeric condensation product of AC-I and 1,10-decane dicarboxylic acid is the same a formula I above, except that the methyl group attached at the 3 or meta position on each cyclohexyl groups or rings is replaced with hydrogen as shown in formula II.

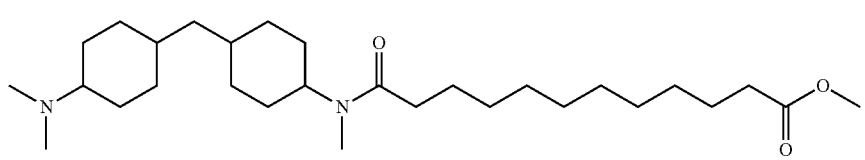

(II)

The molecular number of the polymeric condensation product formed from monomeric unit II will range from 14,000 to 20,000 with a molecular numbers of about 17,000 being preferred. The polyamide particles formed from this polymeric condensation product should also have particle sizes of below 100 microns. It is also preferred that the particles range in size from 3 to 60 microns and more preferably from 10 to 30 microns. It is also preferred that the average particle size is from 15 to 25 microns. The polyamide particles may also be regular or irregular in shape. For example, the particles may be substantially spherical or they can be particles with a jagged shape.

The monomeric unit corresponding to formula II maybe in the form of stereo isomers where the nitrogen groups attached to the cyclohexyl ring are in a cis-cis orientation, cis-trans orientation or trans-trans orientation. The polyamide formed from monomer II may include one, two or all three stereo isomers. Polyamides which contains mixtures of all three monomeric stereo isomers tend to be amorphous, while polyamides that are composed predominately of one stereo isomer tend to be semi-crystalline. Processing conditions are controlled to provide the desired mixture of stereo isomers. Trogamid® CX9704 is an exemplary amorphous polyamide that is a mixture of all three isomeric forms of formula II. Trogamid® CX9704 is available from Evonik (Mobile, Ala.). Trogamid® CX9705 is an exemplary semi-crystalline polyamide that is composed predominately of the trans-trans isomeric form of formula II. Trogamid® CX9705 is available from Evonik (Mobile, Ala.).

Preferred polyamide particles are hybrid polyamide particles where each hybrid polyamide particle contains a mixture of the above amorphous and semi-crystalline polyamides. The hybrid polyamide particles are made by dissolving the desired amounts of amorphous and semi-crystalline polyamide in a suitable solvent, such as ethylene glycol, to form a hybrid mixture. The hybrid mixture is then extruded and/or processed according to conventional polyamide processing procedures to remove the solvent and form the desired hybrid particles that each contain a mixture of amorphous and semi-crystalline polyamide.

The hybrid polyamide particles should have particle sizes of below 100 microns. It is preferred that the hybrid polyamide particles range in size from 3 to 60 microns and more preferably from 10 to 30 microns. It is preferred that the average hybrid polyamide particle size is from 15 to 25 microns. The hybrid polyamide particles may also be regular or irregular in shape. For example, the hybrid polyamide particles may be substantially spherical or they can be particles with a jagged shape.

The hybrid polyamide particles are made from a hybrid mixture that contains amounts of amorphous and semi-crystalline polyamide such that the resulting hybrid polyamide particles each contain from 20 to 80 weight percent amorphous polyamide, based on the total weight of the hybrid polyamide particle, and from 20 to 80 weight percent semi-crystalline polyamide, based on the total weight of the hybrid polyamide particle. Preferably, each hybrid polyamide particle will contain from 65 to 75 weight percent amorphous polyamide and from 25 to 35 weight percent semi-crystalline polyamide, based on the total weight of the hybrid polyamide particle. Most preferred are hybrid polyamide particles that each contain 70±1 weight percent amorphous polyamide and 30±1 weight percent semi-crystalline polyamide, based on the total weight of the hybrid polyamide particle.

In this specification, the hybrid polyamide particles are identified by the relative amounts of amorphous and semi-crystalline polyamide that are present in each hybrid polyamide particle. For example, hybrid polyamide particles that contain a mixture of 70 wt % CX9704 polyamide (amorphous) and 30 wt % CX9705 polyamide (semi-crystalline) are identified as hybrid polyamide particles 70A/30SC and hybrid polyamide particles that contain a mixture of 30 wt % CX9704 polyamide (amorphous) and 70 wt % CX9705 (semi-crystalline) polyamide are identified as hybrid polyamide particles 30A/70SC.

Differential scanning calorimetry (DSC) is a standard test that is used to measure the crystalline and amorphous nature of polymers. Table A sets forth the DSC test results for an exemplary amorphous polyamide (Trogamid® CX9704), an exemplary semi-crystalline polyamide (Trogamid® CX9705) and exemplary hybrid polyamides, which are composed of mixtures of Trogamid® CX9704 and Trogamid® CX9705, and which were used to make hybrid polyamide particles 70A/30SC and 30A/70SC.

TABLE A

|  | Peak 1 (Exotherm) | | Peak 2 (Endotherm) | | |
| --- | --- | --- | --- | --- | --- |
|  | Temp (° C.) | ΔH | Temp (° C.) | ΔH | $T_g$ (° C.) |
| CX9705 | 168 | 15.7 | 247 | 22.2 | 132 |
| CX9704 |  | No peak |  |  | 131 |
| 70 wt % CX9704/ 30 wt % CX9705 (70A/30SC) | none | 0 |  |  | 124 |
| 30 wt % CX9704/ 70 wt % CX9705 (30A/70SC) | 180 | 14 |  |  | 124 |

The preceding description regarding the polyamide component including polyamide particles that are hybrid polyamide particles is not limited to polyamides having the monomeric unit of formula II. Any polyamide that is used in toughening epoxy resins and which can be made in amorphous and semi-crystalline forms may be used to form hybrid polyamide particles.

The thermoplastic particle component may also include one or more other types of polyamide particles that are typically used in thermoplastic toughened epoxy resins including, for example, polyamide (PA) 11, PA6, PA12, PA6/PA12 copolymer, PA4, PA8, PA6.6, PA4.6, PA10.10, PA6.10 and PA10.12.

An exemplary thermoplastic particle component contains a first group of polyamide particles which do not contain crosslinked polyamide and a second group of polyamide particles that do contain crosslinked polyamide.

The first group of polyamide particles may be hybrid polyamide particles, as described above, or any of the polyamide particle that do not contain crosslinked polyamide and which are typically used in thermoplastic toughened epoxy-based prepreg. Such particles may be composed of polyamide (PA) 11, PA6, PA12, PA6/PA12 copolymer, PA4, PA8, PA6.6, PA4.6, PA10.10, PA6.10 and PA10.12. Non-crosslinked polyamide particles are available commercially from a number of sources. Suitable non-crosslinked polyamide 12 particles are available from Kobo Products under the trade name SP10L. SP10L particles contain over 98 wt % PA 12. The particle size distribution is from 7 microns to 13 microns with the average particle size being 10 microns. The density of the particles is 1 g/cm$^3$. It is preferred that the PA12 particles are at least 95 wt % PA12, excluding moisture content. It is also preferred that the hybrid polyamide particles are at least 95 wt % amorphous and semi-crystalline polyamide, excluding moisture content.

Other suitable non-crosslinked particles are available from Arkema (Colombes, France) under the tradenames Orgasol 1002 powder and Orgasol 3803 powder. Orgasol 1002 powder is composed of 100% PA6 particles having an average particle size of 20 microns. Orgasol 3803 is composed of particles that are a copolymer of 80% PA12 and 20% PA6 with the mean particle size being from 17 to 24 microns. Orgasol 2002 is a powder composed of non-crosslinked PA12 particles that may also be used in the first group of particles.

A preferred non-crosslinked polyamide particles for the first group of thermoplastic particles are polyamide 11 particles, which are also available commercially from a number of sources. The polyamide 11 particles are available from Arkema (Colombes, France) under the trade name Rislan PA11. These particles contain over 98 wt % PA 11 and have a particle size distribution of 15 microns to 25 microns. The average particle size is 20 microns. The density of the Rislan PA1 1 particles is 1 g/cm$^3$. It is preferred that the PA 11 particles are at least 95 wt % PA11, excluding moisture content.

The second group of thermoplastic polyamide particles are particles that contain crosslinked polyamide on the surface of the particle, in the interior of the particle or both. The crosslinked polyamide particles may be made from polyamide that has been crosslinked prior to particle formation or non-crosslinked polyamide particles may be treated with suitable crosslinking agents to produce crosslinked polyamide particles.

Suitable crosslinked particles contain crosslinked PA11, PA6, PA12, PA6/PA12 copolymer, PA4, PA8, PA6.6, PA4.6, PA10.10, PA6.10 and PA10.12. Any of the crosslinking agents commonly used to cross link polyamide are suitable. Exemplary crosslinking agents are epoxy-based crosslinking agents, isocyanate-based crosslinking agents, carbodiimide-based crosslinking agents, acyllactam-based crosslinking agents and oxazoline-based crosslinking agent. Preferred crosslinked particles are PA12 particles that contain PA12 that has been crosslinked with an epoxy crosslinking agent. The procedures used to cross link thermoplastic polymers, including polyamide, are known. For examples, see U.S. Pat. Nos. 6,399,714, 8,846,818 and U.S. Published Patent Application US 2016/0152782 A1. The contents of these three references are hereby incorporated by reference.

Crosslinked PA12 particles are available commercially from Arkema (Colombes, France) under the tradename ORGASOL 2009 polyamide powder, which is also known as CG352. The PA12 particles present in ORGASOL 2009 polyamide powder are composed of at least 40% PA12 that has been cross linked with an epoxy-based crosslinking agent. The ORGASOL 2009 crosslinked polyamide particles have an average particle size of 14.2 microns with only 0.2% of the particles having a diameter of greater than 30 microns. The melting point of ORGASOL 2009 crosslinked particles is 180° C. The specific surface area of the ORGASOL 2009 particles is 1.9 and the moisture content of the particles is 0.34%.

The crosslinked polyamide particles should each contain from 40 to 70% crosslinked polyamide. Preferably, the crosslinked polyamide particles should each contain from 40 to 60% crosslinked polyamide.

Preferably, both the non-crosslinked and crosslinked polyamide particles should have particle sizes of below 100 microns. It is preferred that the particles range in size from 5 to 60 microns and more preferably from 5 to 30 microns. It is preferred that the average particle size is from 5 to 20 microns. The particles may be regular or irregular in shape. For example, the particles may be substantially spherical or they can be particles with a jagged shape. It is preferred that the non-crosslinked particles have an average particle size that is larger than the crosslinked particles. Preferably, the average non-crosslinked particles size will range from 15 to 25 microns and the average crosslinked particle size will range from 10 to 20 microns.

The thermoplastic particle component is present in the range 5 wt % to 20 wt %, based on the total weight of the uncured resin matrix. Preferably, there will be from 7 to 17 wt % thermoplastic particle component. The relative amounts of non-crosslinked and crosslinked particles may be varied when a combination of crosslinked and non-crosslinked particles are used. Weight ratios of non-crosslinked particles to crosslinked particles may range from 4:1 to 1.5:1. Preferably, the weight ratios of non-crosslinked particles to crosslinked particles will range from 3.5:1 to 2.5:1. A combination of hybrid polyamide particles and crosslinked particles is a preferred thermoplastic particle component for use with the DEN/TRIF matrix resin embodiment.

Hybrid polyamide particles are a preferred particle for use in the thermoplastic component. Hybrid polyamide particles may be used in combination with a wide variety of epoxy resin components other than the DEN/TRIF and DEN/TRIF/TETF epoxy resin components. For example, hybrid polyamide particles may be used to toughen epoxy resins that include a difunctional epoxy resin as all or part of the epoxy resin component. Difunctional epoxy resins include any suitable epoxy resin having two epoxy functional groups. The difunctional epoxy resin may be saturated, unsaturated, cycloaliphatic, alicyclic or heterocyclic. The difunctional epoxy may be used alone or in combination with multifunctional epoxy resins to form the resin component. Resin components that contain only multifunctional epoxy are also possible.

Difunctional epoxy resins, by way of example, include those based on: diglycidyl ether of Bisphenol F, Bisphenol A (optionally brominated), glycidyl ethers of phenol-aldehyde adducts, glycidyl ethers of aliphatic diols, diglycidyl ether, diethylene glycol diglycidyl ether, Epikote, Epon, aromatic epoxy resins, epoxidized olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Salt Lake City, Utah) under the trade names Araldite GY281 and GY285 and from Ciba-Geigy (Tarrytown, N.Y.) under the trade name LY9703.

The hybrid polyamide particles may be used to toughen epoxy resin components that include trifunctional and/or tetrafunctional epoxy resins other than those previously described. The multifunctional epoxy resins may be saturated, unsaturated, cycloaliphatic, alicyclic or heterocyclic. Suitable multifunctional epoxy resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidized olefins; brominated resins; aromatic glycidyl amines; heterocyclic glycidyl imidines and amides; glycidyl ethers; fluorinated epoxy resins or any combination thereof.

A trifunctional epoxy resin has three epoxy groups substituted either directly or indirectly in a para or meta orientation on the phenyl ring in the backbone of the compound. A tetrafunctional epoxy resin has four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morristown, N.J.)

Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidized olefins; brominated resins, aromatic glycidyl amines and glycidyl ethers; heterocyclic glycidyl imidines and amides; glycidyl ethers; fluorinated epoxy resins or any combination thereof.

In the DEN/TRIF matrix resin embodiment, the total amount of polyamide particles in the uncured resin may vary from 9 to 21 weight percent based on the total weight of the uncured resin. Preferably, the total amount of polyamide particles in the uncured resin will range from 11 wt % to 19 wt %, based on the total weight of the uncured resin matrix. More preferably, the total amount of polyamide particles in the uncured resin will range from 12 wt % to 17 wt %, based on the total weight of the uncured resin matrix.

In a preferred embodiment, the thermoplastic particle component includes a combination of polyimide particles and hybrid polyamide particles. This particle combination is a preferred thermoplastic particle component for use with the DEN/TRIF/TETF matrix resin embodiment.

Preferred polyimide particles are available commercially from HP Polymer GmbH (Lenzig, Austria) as P84 polyimide molding powder. Suitable polyamide particles are also available commercially from Evonik Industries (Austria) under the tradename P84NT. The polyimide used to make the particles is disclosed in U.S. Pat. No. 3,708,458, the contents of which is hereby incorporated by reference. The polyimide is made by combining benzophenone-3,3',4,4'-tetracarboxylic acid dianhydride with a mixture of 4,4'-methylenebis (phenyl isocyanate) and toluene diisocyanate (2,4- or 2,6-isomer). The amine analogs may be used in place of the aromatic iso- and diisocyanates. The CAS Registry No. of the polyimide is 58698-66-1.

The polyimide particles are composed of an aromatic polyimide having the repeating monomer formula:

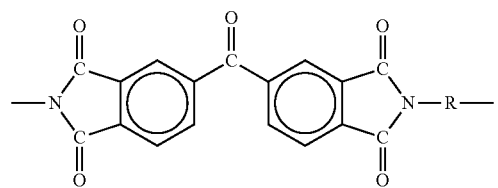

where from 10 to 90% of the R groups in the overall polymer are an aromatic group having the formula:

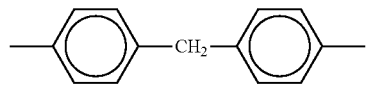

with the remaining R groups in the polymer being

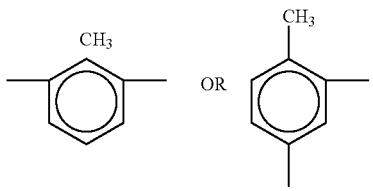

The size of the polyimide particles in the powder typically ranges from 2 microns to 35 microns. A preferred polyimide powder will contain particles that range in size from 2 to 30 microns with the average particle size ranging from 5 microns to 15 microns. Preferably, at least 90 weight percent of the polyimide particles in the powder will be in the size range of 2 microns to 20 microns. The polyimide particles may be regular or irregular in shape. For example, the particles may be substantially spherical or they can be particles with a jagged shape.

The polyimide particles contain at least 95 weight percent polyimide. Small amounts (up to 5 weight percent) of other materials may be included in the particles provided that they do not adversely affect the overall characteristics of the particles.

The glass transition temperature (Tg) of the polyimide particles should be about 330° C. with the density of individual particles being 1.34 grams per cubic centimeter. The linear coefficient of thermal expansion of the particles is 50.

The total amount of thermoplastic particles in the uncured DEN/TRIF/TETF matrix resin embodiment is preferably from 10 to 20 weight percent based on the total weight of the uncured resin. In order to obtain high resistance to delamination, the weight ratio between the hybrid polyamide particles and the polyimide particles can range from 3.5:1.0 to 1.0:1.0. Preferably, the weight ratio between the hybrid polyamide particles and polyimide particles is between 3.2:1.0 and 2.8:1.0. In a particularly preferred DEN/TRIF/TETF matrix resin, the amount of hybrid polyamide particles is from 8 to 10 weight percent of the total weight of the uncured resin and the amount of polyimide particles is from 2 to 4 weight percent of the total weight of the uncured resin.

The uncured resin matrix includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylenetetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diaminodiphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS). Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) is selected so that it provides curing of the matrix at suitable temperatures. The amount of curing agent required to provide adequate curing of the matrix will vary depending upon a number of factors including the type of resin being cured, the desired curing temperature and curing time. Curing agents typically may also include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman Corporation (The Woodlands, Tex.).

The curing agent is present in an amount that ranges from 10 wt % to 30 wt % of the uncured resin matrix. In the DEN/TRIF matrix resin, the curing agent is present in an amount that ranges from 17 wt % to 27 wt %. More preferably, the curing agent is present in the range 21 wt % to 25 wt % of the uncured resin matrix. In the DEN/TRIF matrix resin, 4,4'-DDS is a preferred curing agent. It is preferably used as the sole curing agent in an amount ranging from 20 wt % to 26 wt %. Small amounts (less than 5 wt %) of other curatives, such as 3,3'-DDS, may be included, if desired.

In the DEN/TRIF/TETF matrix resin, the curing agent is present in an amount that ranges from 15 wt % to 30 wt % of the uncured resin. Preferably, the curing agent is present in an amount that ranges from 20 wt % to 30 wt %. 3,3'-DDS is the preferred curing agent. It preferably used as the sole curing agent in amounts ranging from 24 to 28 weight percent based on the total weight of the uncured resin. Small amounts (less than 5 wt %) of other curatives, such as 4,4'-DDS, may be included, if desired.

Accelerators may also being included to enhance or promote curing. Suitable accelerators are any of the urone compounds that have been commonly used in the curing of epoxy resins. Specific examples of accelerators, which may be used alone or in combination, include N,N-dimethyl,N'-3,4-dichlorphenyl urea (Diuron), N'-3-chlorophenyl urea (Monuron), and preferably N,N-(4-methyl-m-phenylene bis [N',N'-dimethylurea] (e.g. Dyhard UR500 available from Degussa).

The uncured resin matrix of the present invention also includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added and mixed with the cooled resin blend.

Exemplary thermoplastic toughening agents/particles include any of the following thermoplastics, either alone or in combination: polysulfone, polyethersulfone, polyetherimide, high performance hydrocarbon polymers, elastomers, and segmented elastomers.

A suitable toughening agent, by way of example, is particulate polyethersulfone (PES) that is sold under the trade name Sumikaexcel 5003P, and which is commercially available from Sumitomo Chemicals (New York, N.Y.). Alternatives to 5003P are Solvay polyethersulphone 105RP, or the non-hydroxyl terminated grades such as Solvay 1054P which is commercially available from Solvay Chemicals (Houston, Tex.). Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the matrix.

In the DEN/TRIF matrix resin, the toughening agent is present in the range 5 wt % to 15 wt %, based on the total weight of the uncured resin matrix. Preferably, the toughening agent is present in the range 7 wt % to 12 wt %. More preferably, the toughening agent is present in the range 8 wt % to 11 wt %.

In the DEN/TRIF/TETF matrix resin, the PES toughening agent is present in the range 5 wt % to 26 wt %, based on the total weight of the uncured resin. Preferably, the toughening agent is present in the range 7 wt % to 14 wt %. The preferred amount of PES for use in making resins with relatively low minimum viscosity (25-45 Poise) is from 7 to 9 weight percent based on the total weight of the uncured resin. The preferred amount of PES for use in making resins with relatively high minimum viscosity (55-75 Poise) is from 10 to 13 weight percent based on the total weight of the uncured resin.

The matrix resin may also include additional ingredients, such as performance enhancing or modifying agents provided they do not adversely affect the tack and out-life of the prepreg or the strength and damage tolerance of the cured composite part. The performance enhancing or modifying agents, for example, may be selected from core shell rubbers, flame retardants, wetting agents, pigments/dyes, UV absorbers, anti-fungal compounds, fillers, conducting particles, and viscosity modifiers.

Exemplary core shell rubber (CSR) particles are composed of a crosslinked rubber core, typically a copolymer of butadiene, and a shell composed of styrene, methyl methacrylate, glycidyl methacrylate and/or acrylonitrile. The core shell particles are usually provided as particles dispersed in an epoxy resin. The size range of the particles is typically from 50 to 150 nm. Suitable CSR particles are described in detail in U.S. Patent Publication US2007/0027233A1, the contents of which is hereby incorporated by reference. Preferred core shell particles are MX core-shell particles, which are available from Kane Ace (Pasadena, Tex.). A preferred core shell particle for inclusion in the DEN/TRIF matrix resin is Kane Ace MX-418. MX-418 is supplied as a 25 wt % suspension of core shell particles in a tetrafunctional epoxy resin. The core shell particles in MX-418 are polybutadiene (PBd) core shell particles which have an average particle size of 100 nanometers.

Suitable fillers include, by way of example, any of the following either alone or in combination: silica, alumina, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles.

Potato shaped graphite (PSG) particles are suitable conducting particles. The use of PSG particles in carbon fiber/epoxy resin composites is described in detail in U.S. Patent Publication No. US 2015/0179298 A1, the contents of which is hereby incorporated by reference. The PSG particles are commercially available from NGS Naturgraphit (Germany) as SG25/99.95 SC particles or from Nippon Power Graphite Company (Japan) as GHDR-15-4 particles. These commercially available PSG particles have average particle sizes of from 10-30 microns with the GHDR-15-4 particles having a vapor deposited coating of carbon on the outer surface of the PSG particles.

The uncured resin matrix may include small amounts (less than 5 wt % and preferably less than 1 wt %) of an additional epoxy or non-epoxy thermosetting polymeric resin. For DEN/TRIF/TETF matrix resins, the epoxy resin component contains at least 95 wt % DEN, TRIF and TETF and more preferably at least 99 wt % of the three epoxy resins. For DEN/TRIF matrix resins, the epoxy resin component contains at least 95 wt % DEN and TRIF and more preferably at least 99 wt % of the two epoxy resins. Suitable additional epoxy resins include difunctional epoxy resins, such as bisphenol A and bisphenol F type epoxy resins. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins or any combination thereof. The additional thermoset resin, if any, is preferably selected from epoxy resins, cyanate ester resins, benzoxazine and phenolic resins.

The uncured resin is made in accordance with standard prepreg matrix resin processing. In general, the hydrocarbon novolac epoxy resin and other epoxy resin(s) are mixed together at room temperature to form a resin mix to which the thermoplastic toughening agent is added. This mixture is then heated to about 120° C. for about 1 to 2 hours to dissolve the thermoplastic toughening agent. The mixture is then cooled down to about 80° C. and the remainder of the ingredients (thermoplastic particle component, curing agent and other additive, if any) is mixed into the resin to form the final uncured resin matrix that is impregnated into the fiber reinforcement.

The uncured resin is applied to the fibrous reinforcement to form an uncured resin matrix in accordance with any of the known prepreg manufacturing techniques. The fibrous reinforcement may be fully or partially impregnated with the uncured resin. In an alternate embodiment, the uncured resin may be applied to the fiber fibrous reinforcement as a separate layer, which is proximal to, and in contact with, the fibrous reinforcement, but does not substantially impregnate the fibrous reinforcement. The prepreg, which is also referred to as semi-preg, is typically covered on both sides with a protective film and rolled up for storage and shipment at temperatures that are typically kept well below room temperature to avoid premature curing. The actual resin matrix is not formed until further processing of the semi-preg. Any of the other prepreg manufacturing processes and storage/shipping systems may be used if desired.

The fibrous reinforcement of the prepreg may be selected from any fiberglass, carbon or aramid (aromatic polyamide) fibers. The fibrous reinforcement is preferably carbon fibers. Preferred carbon fibers are in the form of tows that contain from 3,000 to 50,000 carbon filaments (3K to 50K). Commercially available carbon fiber tows that contain 6,000 or 24,000 carbon filaments (6K or 24K) are preferred.

The uncured matrix resins of the present invention are particularly effective in providing laminates that have high strength properties and damage tolerance when the carbon tow contains from 6,000 to 24,000 filaments, the tensile strength is from 750 to 860 ksi, the tensile modulus is from 35 to 45 Msi, the strain at failure is 1.5 to 2.5%, the density is 1.6 to 2.0 g/cm$^3$ and the weight per length is from 0.2 to 0.6 g/m. 6K and 12K IM7 carbon tows (available from Hexcel Corporation) are preferred. IM7 12K fibers have a tensile strength of 820 ksi, the tensile modulus is 40 Msi, the strain at failure is 1.9%, the density is 1.78 g/cm$^3$ and the weight per length is 0.45 g/m. IM7 6K fibers have a tensile strength of 800 ksi, the tensile modulus is 40 Msi, the strain at failure is 1.9%, the density is 1.78 g/cm$^3$ and the weight per length is 0.22 g/m. IM7 fibers and carbon fibers with similar properties are generally considered to be intermediate modulus carbon fibers. IM8 carbon fibers, which are commercially available from Hexcel Corporation (Dublin, Calif.), are also a preferred type of medium modulus carbon fiber.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg that is used to form sheet molding compound. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Les Avenieres, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

The following exemplary DEN/TRIF/TETF resin formulation may be impregnated into a fibrous support to form a resin matrix in accordance with the present invention (all weight percentages are based on the total resin weight): 12 wt % to 16 wt % dicyclopentadiene novolac epoxy resin (TACTIX®556 or XD-1000-2L); 17 wt % to 21 wt % triglycidyl-p-aminophenol (MY0510); 16 wt % to 20 wt % tetrafunctional epoxy (MY721); 10 wt % to 14 wt % polyethersulfone (5003P); 2 wt % to 4 wt % polyimide particles (P84HCM); 7 wt % to 11 wt % hybrid polyamide particles; and 24 wt % to 28 wt % 3,3'-DDS as the curing agent.

With respect to the DEN/TRIF matrix resin embodiments of the invention, an exemplary DEN/TRIF matrix resin includes from 34 wt % to 38 wt % triglycidyl-m-aminophenol (MY0600); from 16 wt % to 20 wt % hydrocarbon novolac epoxy resin (TACTIX 556 or XD-1000-2L); from 7 wt % to 11 wt % polyethersulfone (5003P) as a toughening agent; from 2 wt % to 7 wt % crosslinked polyamide 12 particles (ORGASOL 2009); from 9 wt % to 13 wt % hybrid polyamide particles where the weight ratio of hybrid polyamide particles to crosslinked polyamide 12 particles is from 2.5:1.0 to 3.0:1 and preferably 2.7:1 to 2.8:1; and from 20 wt % to 26 wt % 4,4'-DDS as the curing agent.

Another exemplary DEN/TRIF matrix resin includes from 34 wt % to 38 wt % triglycidyl-m-aminophenol (MY0600); from 16 wt % to 20 wt % hydrocarbon novolac epoxy resin (TACTIX 556 or XD-1000-2L); from 7 wt % to 11 wt % polyethersulfone (5003P) as a toughening agent; from 9 wt % to 13 wt % polyamide 11 particles (Rislan PA11); from 2 wt % to 4 wt % hybrid polyamide particles; and from 20 wt % to 26 wt % 4,4'-DDS as the curing agent.

A preferred DEN/TRIF matrix resin includes from 34 wt % to 38 wt % triglycidyl-m-aminophenol (MY0600); from 16 wt % to 20 wt % hydrocarbon novolac epoxy resin (TACTIX 556 or XD-1000-2L); from 7 wt % to 11 wt % polyethersulfone (5003P) as a toughening agent; from 13 wt % to 17 wt % hybrid polyamide particles; and from 20 wt % to 26 wt % 4,4'-DDS as the curing agent.

The prepreg may be molded using any of the standard techniques used to form composite parts. Typically, one or more layers of prepreg are placed in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high compressive strength, interlaminar fracture toughness and resistance to impact damage are needed.

Examples 1-2, which are examples of practice with respect to the DEN/TRIF/TETF matrix resin embodiment of the invention, are as follows:

Example 1

A preferred exemplary resin formulation in accordance with the present invention is set forth in TABLE 1. A matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients added and mixed in thoroughly.

The hybrid polyamide particles used in the following examples are listed according to the weight percentage of amorphous (Trogamid® CX9704) polyamide and semi-crystalline (Trogamid® CX9705) polyamide that are present in each particle. As previously mentioned, hybrid polyamide particles that contain a mixture of 70 wt % CX9704 polyamide and 30 wt % CX9705 polyamide are identified as hybrid particles "(70A/30SC)", and hybrid polyamide particles that contain a mixture of 30 wt % CX9704 polyamide and 70 wt % CX9705 polyamide are identified as hybrid polyamide particles "(30A/70SC)". The hybrid polyamide particles used in the examples, as well as the amorphous and semi-crystalline particles used in the comparative examples, ranged in particle size from 3 microns to 10 microns with an average particle size of 6 microns.

TABLE 1

| Ingredient | Amount (Wt %) |
| --- | --- |
| Hydrocarbon epoxy novolac resin (TACTIX ®556) | 14.10 |
| Trifunctional para-glycidyl amine (MY0510) | 19.15 |
| N,N,N',N'-tetraglycidyl-4,4'-diaminodiphenyl methane (MY721) | 17.85 |
| Thermoplastic Toughening Agent (polyether sulfone - 5003P) | 11.50 |
| Polyimide Particles (P84HCM) | 3.0 |
| Hybrid Polyamide Particles (70A/30SC) | 9.0 |
| Aromatic diamine curing agent (3,3-DDS) | 25.40 |

Exemplary prepreg was prepared by impregnating one or more layers of unidirectional carbon fibers with the resin formulation of TABLE 1. The unidirectional carbon fibers (12K IM7 available from Hexcel Corporation) were used to make a prepreg in which the matrix resin amounted to 35 weight percent of the total uncured prepreg weight and the fiber areal weight was 192 grams per square meter (gsm). 26-ply laminates were prepared using standard prepreg fabrication procedures. The laminates were cured in an autoclave at 177° C. for about 2 hours. The cured laminates were tested to determine interlaminar fracture toughness.

G2c is a standard test that provides a measure of the interlaminar fracture toughness of a cured laminate. G2c was determined as follows. A 26-ply unidirectional laminate was cured with a 3 inch fluoroethylene polymer (FEP) film inserted along one edge, at the mid-plane of the layup, perpendicular to the fiber direction to act as a crack starter. The laminate was cured for 2 hours at 177° C. in an autoclave and gave a nominal thickness of 3.8 mm. Consolidation was verified by C-scan. G2c samples were machined from the cured laminate. G2c was tested at room temperature in accordance with BSS7320. The G2c values listed below are the average of the first and second cracks observed during the testing in accordance with BSS7320.

Cured test laminates were also subjected to standard tests to determine their tolerance to damage (CAI) and interlaminar fracture toughness (G1c and G2c). Compression after Impact (CAI) was determined using a 270 in-lb impact against a 32-ply quasi-isotropic laminate. The specimens were machined, impacted and tested in accordance with Boeing test method BSS7260 per BMS 8-276. Values are normalized to a nominal cured laminate thickness of 0.18 inches.

When the terms "CAI" and "G2c" are used herein to define a property exhibited by a cured laminate, the terms mean the property as measured by the above described testing procedures.

The G2c of the cured 26-ply laminate was 12.6. The CAI was 46.0. Open hole compression (OHT) and open hole compression (OHC) were also measured according to standard procedures at room temperature and found to be above acceptable limits for structural parts.

Example 2

An exemplary prepreg having a DEN/TRIF/TETR resin matrix with the formula set forth in TABLE 2 was prepared in the same manner as Example 1.

TABLE 2

| Ingredient | Amount (Wt %) |
| --- | --- |
| Hydrocarbon epoxy novolac resin (TACTIX ®556) | 14.10 |
| Trifunctional para-glycidyl amine (MY0510) | 19.15 |
| N,N,N',N'-tetraglycidyl-4,4'-diaminodiphenyl methane (MY721) | 17.85 |
| Thermoplastic Toughening Agent (polyether sulfone - 5003P) | 11.50 |
| Polyimide Particles (P84HCM) | 3.0 |
| Hybrid Polyamide Particle (30A/70SC) | 9.0 |
| Aromatic diamine curing agent (3,3-DDS) | 25.40 |

26-ply laminates were prepared, cured and tested for G2c at room temperature in the same manner as Example 1. The G2c was 11.8 and CAI was 43.6. The OHT and OHC were both also above acceptable limits for structural parts. The values for G2c and CAI in Example 2 (hybrid particles 30A/70SC) are unexpectedly less than in Example 1 (hybrid particles 70A/30SC), where the amount of amorphous polyamide in the particle is substantially greater than the amount of semi-crystalline polyamide. Accordingly, as previously mentioned, it is preferred that hybrid polyamide particles contain from 60 wt % to 80 wt % amorphous polyamide and from 20 wt % to 40 wt % semi-crystalline polyamide.

A first comparative example was performed in which semi-crystalline polyamide particles made from Trogamid® CX9705 polyamide were substituted in place of the hybrid polyamide particles used in Examples 1 and 2. 26-ply laminates were prepared, cured and tested for G2c at room temperature in the same manner as Example 1. The G2c was 9.0. CAI was 43.0. It was unexpected that the G2c and CAI would be lower when particles containing only the semi-crystalline form of the polyamide were substituted in place of the hybrid particles that contain a mixture of the semi-crystalline form and amorphous form of the same polyamide.

A second comparative example was performed in which amorphous polyamide particles made from Trogamid® CX9704 polyamide were substituted in place of the hybrid polyamide particles used in Examples 1 and 2. 26-ply laminates were prepared, cured and tested for G2c at room temperature in the same manner as Example 1. The G2c was 10.0 and CAI was 44.9. It was unexpected that the G2c and CAI would be lower when particles containing only the amorphous form was substituted in place of the hybrid particles that contain a 70A/30SC mixture of the amorphous and semi-crystalline forms of the same polyamide, as set forth in Example 1. It was also unexpected that the G2c of the second comparative example would be lower when particles containing only the amorphous form was substituted in place of the hybrid particles that contain a 30A/70SC mixture of the amorphous and semi-crystalline forms of the same polyamide, as set forth in Example 2, and that the CAI of the second comparative example was higher than Example 2.

The above examples and comparative examples all use polyamide particles that are made from a polyamide that has the same monomeric unit (formula II). It is unexpected that hybrid polyamide particles, which each contain a mixture of amorphous and semi-crystalline forms of the same polymer, are capable of providing higher G2c and CAI test results than can be achieved using the amorphous or semi-crystalline form of the polyamide alone.

Examples 3-5, which are examples of practice with respect to the DEN/TRIF matrix resin embodiment of the invention, are as follows:

Example 3

An exemplary DEN/TRIF resin formulation in accordance with the present invention is set forth a TABLE 3. An uncured matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients were added and mixed in thoroughly in the same manner as Examples 1-2.

TABLE 3

| Ingredient | Amount (Wt %) |
|---|---|
| dicyclopentadiene novolac epoxy resin (XD-1000-2L) | 18.0 |
| Trifunctional meta-glycidyl amine (MY0600) | 36.02 |
| Thermoplastic Toughening Agent (polyether sulfone - 5003P) | 9.0 |
| Hybrid Polyamide Particles (70A/30SC) | 15.0 |
| Aromatic diamine curing agent (4,4'-DDS) | 21.98 |

Exemplary prepreg was prepared by impregnating a layer of unidirectional carbon fibers with the resin formulation of TABLE 3 to form a prepreg composed of reinforcing fibers and an uncured resin matrix. The unidirectional carbon fibers were 12K IM7. The uncured resin matrix amounted to 35 weight percent of the total uncured prepreg weight and the fiber areal weight of the uncured prepreg was 145 grams per square meter (gsm).

The prepreg was used to form a laminate in the same manner as Examples 1-2. The laminate was cured in an autoclave at 177° C. for about 2 hours to form a cured test laminate. The cured test samples were subjected to testing in accordance with ASTM D5528 in the same manner as Examples 1-2 in order to determine G2c and CAI. The G2c was determined to be 18.1 and the CAI was 55.9.

A comparative example was performed in which semi-crystalline polyamide particles made from Trogamid® CX9705 polyamide were substituted in place of the hybrid polyamide particles used in Example 3. 26-ply laminates were prepared, cured and tested for CAI and G2c at room temperature in the same manner as Example 1. The CAI was 50.0 G2c was 12.4. It was unexpected that the G2c would be lower when particles containing only the semi-crystalline form of the polyamide were substituted in place of the hybrid particles that contain a mixture of the semi-crystalline form and amorphous form of the same polyamide.

A second comparative example was performed in which amorphous polyamide particles made from Trogamid® CX9704 polyamide were substituted in place of the hybrid polyamide particles used in Example 3. 26-ply laminates were prepared, cured and tested for CAI and G2c at room temperature in the same manner as Example 1. The CAI was 63.2 and G2c was 17.8. It was unexpected that the G2c would be lower when particles containing only the amorphous form was substituted in place of the hybrid particles that contain a mixture of the amorphous form and semi-crystalline form of the same polyamide, as set forth in Example 1. The result is particularly unexpected in view of the substantially lower G2c that was observed in the first comparative example.

The above example and comparative examples all use polyamide particles that are made from a polyamide that has the same monomeric unit (formula II). It is unexpected that hybrid polyamide particles, which each contain a mixture of amorphous and semi-crystalline forms of the same polymer, are capable of providing higher G2c test results than can be achieved using the amorphous or semi-crystalline form of the polyamide alone.

Example 4

An exemplary prepreg having a DEN/TRIF resin matrix with the formula set forth in TABLE 4 was prepared in the same manner as Example 3.

TABLE 4

| Ingredient | Amount (Wt %) |
|---|---|
| dicyclopentadiene novolac epoxy resin (XD-1000-2L) | 18.0 |
| Trifunctional meta-glycidyl amine (MY0600) | 36.02 |
| Thermoplastic Toughening Agent (polyether sulfone - 5003P) | 9.0 |
| Hybrid Polyamide Particles (70A/30SC) | 4.0 |
| PA11 Particles (Rislan 11) | 11.0 |
| Aromatic diamine curing agent (4,4'-DDS) | 21.98 |

26-ply laminates were prepared, cured and tested for CAI and G2c at room temperature in the same manner as Example 1. The CAI was 61.6 and G2c was 16.4. The OHT and OHC were both also above acceptable limits for structural parts.

Example 5

An exemplary prepreg having a DEN/TRIF resin matrix with the formula set forth in TABLE 5 was prepared in the same manner as Example 3.

TABLE 5

| Ingredient | Amount (Wt %) |
|---|---|
| dicyclopentadiene novolac epoxy resin (XD-1000-2L) | 18.0 |
| Trifunctional meta-glycidyl amine (MY0600) | 36.02 |
| Thermoplastic Toughening Agent (polyether sulfone - 5003P) | 9.0 |
| Hybrid Polyamide Particles (70A/30SC) | 11.0 |
| Crosslinked PA12 Particles (ORGASOL 2009) | 4.0 |
| Aromatic diamine curing agent (4,4'-DDS) | 21.98 |

26-ply laminates were prepared, cured and tested for CAI and G2c at room temperature in the same manner as Example 1. The CAI was 61.2 and G2c was 16.5. The OHT and OHC were both also above acceptable limits for structural parts.

Having thus described exemplary embodiments of the present invention, it should be noted by those skilled in the art that the within disclosures are exemplary only and that various other alternatives, adaptations and modifications may be made within the scope of the present invention.

Accordingly, the present invention is not limited by the above-described embodiments, but is only limited by the following claims.

What is claimed is:

1. A pre-impregnated composite material comprising:
A) reinforcing fibers;
B) an uncured resin matrix comprising:
   a) an epoxy resin component comprising a hydrocarbon epoxy novolac resin, a trifunctional epoxy resin and a tetrafunctional epoxy resin;
   b) a thermoplastic particle component comprising a mixture of polyimide particles and hybrid polyamide particles wherein each of said hybrid polyamide particles comprises a mixture of a semi-crystalline polyamide and an amorphous polyamide, said amorphous polyamide being present in an amount of from 60 to 80 weight percent, based on the total weight of said hybrid polyamide particle, and said semi-crystalline polyamide being present in an amount of from 20 to 40 weight percent, based on the total weight of said hybrid polyamide particle, and wherein said semi-crystalline polyamide and amorphous polyamide are comprised of different stereo isomeric forms of the polyamide which is the polymeric condensation product of 1,10-decane dicarboxylic acid and an amine component having the formula

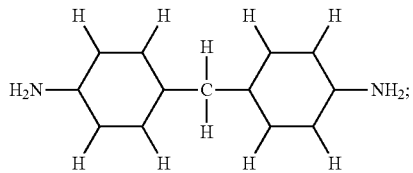 [SMILES: NC1CCC(CC2CCC(N)CC2)CC1]

c) a thermoplastic toughening agent comprising polyethersulfone; and
   d) a curing agent.

2. The pre-impregnated composite material according to claim 1 wherein said amorphous polyamide is present in an amount of from 65 to 75 weight percent, based on the total weight of said hybrid polyamide particle, and said semi-crystalline polyamide being present in an amount of from 25 to 35 weight percent, based on the total weight of said hybrid polyamide particle.

3. The pre-impregnated composite material according to claim 2 wherein said amorphous polyamide being present in an amount of 70±1 weight percent, based on the total weight of said hybrid polyamide particle, and said semi-crystalline polyamide being present in an amount of 30±1 weight percent, based on the total weight of said hybrid polyamide particle.

4. The pre-impregnated composite material according to claim 1 wherein said reinforcing fibers comprise a plurality of carbon fiber tows which each comprises from 10,000 to 14,000 carbon filaments wherein the weight per length of each of said carbon tows is from 0.2 to 0.6 grams per meter and wherein the tensile strength of each of said carbon tows is from 750 to 860 kilopounds per square inch and the tensile modulus of each of said carbon tows is from 35 to 45 megapounds per square inch.

5. The pre-impregnated composite material according to claim 1 wherein said curing agent is an aromatic amine selected from the group consisting of 3,3'-diaminodiphenyl sulphone and 4,4'-diaminodiphenyl sulphone.

6. A composite part or structure that has been formed by curing a pre-impregnated composite material according to claim 1.

7. The composite part or structure according to claim 6 wherein said composite part or structure forms at least part of an aircraft primary structure.

8. A method for making a composite part or structure comprising the step of providing a pre-impregnated composite material according to claim 1 and curing said pre-impregnated composite material to form said composite part or structure.

9. The method for making a composite part or structure according to claim 8 wherein said composite part or structure forms at least part of an aircraft primary structure.

10. A method for making a pre-impregnated composite material that is curable to form a composite part, said method comprising the steps of:
A) providing reinforcing fibers comprising carbon fibers; and
B) impregnating said reinforcing fibers with an uncured resin matrix wherein said uncured resin matrix comprises:
   a) an epoxy resin component comprising a hydrocarbon epoxy novolac resin, a trifunctional epoxy resin and a tetrafunctional epoxy resin;
   b) a thermoplastic particle component comprising a mixture of polyimide particles and hybrid polyamide particles wherein each of said hybrid polyamide particles comprises a mixture of a semi-crystalline polyamide and an amorphous polyamide, said amorphous polyamide being present in an amount of from 60 to 80 weight percent, based on the total weight of said hybrid polyamide particle, and said semi-crystalline polyamide being present in an amount of from from 20 to 40 weight percent, based on the total weight of said hybrid polyamide particle, and wherein said semi-crystalline polyamide and amorphous polyamide are comprised of different stereo isomeric forms of the polyamide which is the polymeric condensation product of 1,10-decane dicarboxylic acid and an amine component having the formula

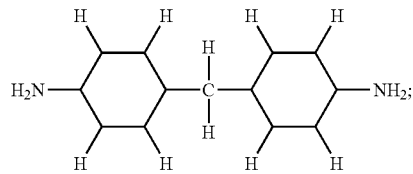 [SMILES: NC1CCC(CC2CCC(N)CC2)CC1]

c) a thermoplastic toughening agent comprising polyethersulfone; and
   d) a curing agent.

11. The method for making a pre-impregnated composite material according to claim 10 wherein said amorphous polyamide is present in an amount of from 65 to 75 weight percent, based on the total weight of said hybrid polyamide particle, and said semi-crystalline polyamide being present in an amount of from 25 to 35 weight percent, based on the total weight of said hybrid polyamide particle.

12. The method for making a pre-impregnated composite material that is curable to form a composite part according to claim 10 wherein said amorphous polyamide being present in an amount of 70±1 weight percent, based on the total weight of said hybrid polyamide particle, and said semi-crystalline polyamide being present in an amount of 30±1 weight percent, based on the total weight of said hybrid polyamide particle.

13. The method for making a pre-impregnated composite material that is curable to form a composite part according to claim 10 wherein said reinforcing fibers comprise a plurality of carbon fiber tows which each comprises from 10,000 to 14,000 carbon filaments wherein the weight per length of each of said carbon tows is from 0.2 to 0.6 grams per meter and wherein the tensile strength of each of said carbon tows is from 750 to 860 kilopounds per square inch and the tensile modulus of each of said carbon tows is from 35 to 45 megapounds per square inch.

14. The method for making a pre-impregnated composite material that is curable to form a composite part according to claim 10 wherein said curing agent is an aromatic amine selected from the group consisting of 3,3'-diaminodiphenyl sulphone and 4,4'-diaminodiphenyl sulphone.

\* \* \* \* \*